Jan. 21, 1936.  J. L. GREEN, SR  2,028,659
HAND TOOL FOR CUTTING GRASS, WEEDS AND THE LIKE
Filed April 4, 1933
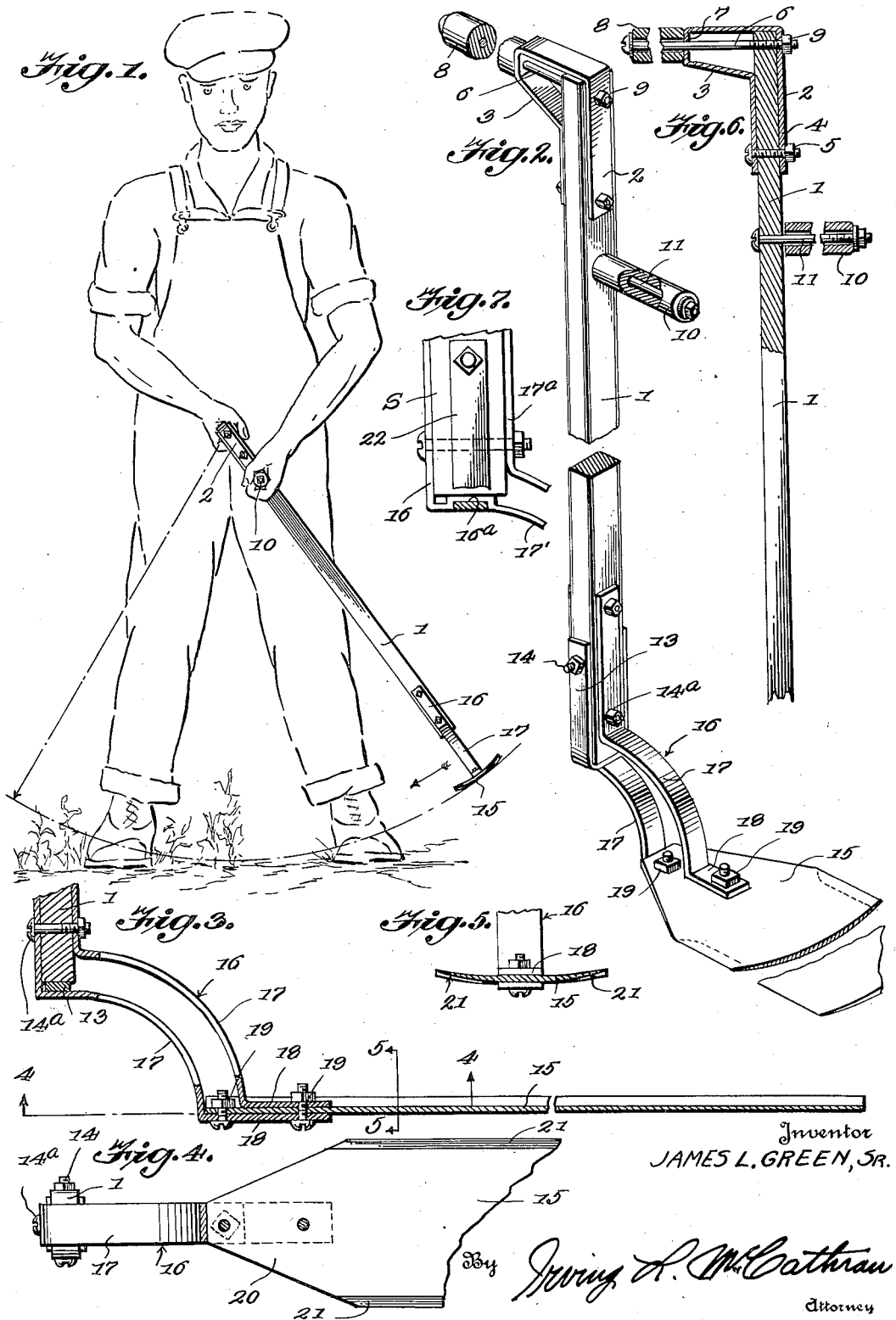
Inventor
JAMES L. GREEN, SR.

Patented Jan. 21, 1936

2,028,659

UNITED STATES PATENT OFFICE 2,028,659

HAND TOOL FOR CUTTING GRASS, WEEDS, AND THE LIKE

James L. Green, Sr., Birmingham, Ala.

Application April 4, 1933, Serial No. 664,405

7 Claims. (Cl. 30—9)

This invention relates to hand tools for cutting grass, weeds, undergrowth, and the like, and has for its object the production of a simple and efficient tool which may be gripped by the hands of the operator and held in front of the body so that the tool may be swung in a pendulum-like manner for the purpose of efficiently cutting down weeds, undergrowth, grass, and the like.

Another object of this invention is the production of a simple and efficient hand tool for cutting grass, weeds, undergrowth, and the like, which is so constructed as to be swung in a pendulum-like manner when operated, and at the same time produce an increased amount of leverage for efficiently cutting growing plants and the like.

A further object of this invention is the production of a simple and efficient hand tool particularly adapted for cutting grass, weeds, and undergrowth, which may be conveniently and easily operated for a long period of time without fatigue, and which at the same time will be comparatively light and very durable.

With these and other objects in view, this invention consists in certain novel constructions, combinations, and arrangements of parts as will be hereinafter more fully described and claimed.

In the drawing:

Figure 1 is a front elevation of the improved hand tool showing the manner in which the same is held by an operator in the act of cutting weeds, grass, and the like.

Figure 2 is a perspective view of the improved tool, certain parts being broken away and shown in section;

Figure 3 is an enlarged vertical section through the lower end of the tool handle blade and connecting brackets between the handle and blade, the brackets being shown partly in elevation;

Figure 4 is a section taken on line 4—4 of Figure 3;

Figure 5 is a section taken on line 5—5 of Figure 3;

Figure 6 is a vertical sectional view through the upper end of the shank of the tool showing the hand grip carried thereby, a portion of the shank being shown in side elevation; and Figure 7 is a side elevation of one end of the shank of the tool showing a modified form of bracket, used for connecting the blade to the lower end of the shank.

By referring to the drawing, it will be seen that 1 designates the shank of the tool which is preferably an elongated comparatively narrow bar. The shank 1 carries a hand grip bracket 2 at its upper end, the bracket 2 being preferably formed of strap iron and having an offset portion 3 partly overhanging the upper end of the shank 1, as shown in Figures 2 and 3. The hand grip bracket 2 comprises a pair of jaws 4 which extend upon opposite sides of the shank 1 and are firmly secured to the shank by means of a bolt 5. A hand grip supporting pin 6 extends through the upper extremity of the shank 1 and also through the outer end 7 of the offset portion 3 of the bracket 2. The outer end of this pin 6 carries a hand roller 8, preferably of an elongated tubular formation, to permit the free rotation of the hand roller 8 upon the supporting pin 6. A nut 9 is threaded upon the outer end of the pin 6 to retain the hand grip roller 8 against displacement. The nut, however, may be removed should it be desired to replace the roller 8 or for the purpose of repair at any time. This hand roller 8 preferably extends rearwardly of the shank 1, as shown.

A forwardly extending hand grip roller 10 is supported upon the front face of the shank 1 and extends at right-angles thereto, this roller 10 being supported upon a supporting pin 11 which extends through the shank 1 and is held in engagement therewith by means of a suitable nut 12. By means of the staggered relation of the hand grip rollers 8 and 10 which are secured to the opposite faces of the shank 1, it will be seen that the shank may be easily gripped by the hands of the operator and the shank may be freely swung in front of the body in spaced relation to the body without fear of coming into contact with the body of the operator.

The lower end of the shank 1 is preferably reinforced by means of a suitable U-shaped metallic strap 13 which is secured to the shank by means of a suitable bolt 14.

A double-edge cutting blade 15 is supported upon the lower end of the shank 1 by means of a pair of connecting brackets 16 and the brackets 16 engage the opposite front and rear faces of the shank 1 as shown in the drawing and are secured in place by means of suitable bolts 14a. One of the brackets extends under the reinforcing strap 13 and the lower end of the shank 1, as shown, and the other bracket is spaced from the first mentioned bracket, both brackets having forwardly extending, downwardly curved or bowed portions 17, the bowed portions of the brackets being arranged in relatively spaced relation. These brackets 16 are provided with forwardly extending feet 18, the feet of one bracket fitting under the cutting blade 15 and the feet of the other bracket resting upon the top of the cutting blade, as shown in Figure 3, suitable bolts 19 being employed for detachably connecting the cutting blade 15 to the brackets 16.

The blade 15 is specially designed and is provided with a thickened inner end 20 which tapers toward the shank 1 and comprises a relatively wide body slightly concavo-convex in cross-section, as shown in Figure 5, and having sharpened under side edges 21 to facilitate the efficient cutting of the grass, undergrowth, or weeds, as the shank 1 is swung in the direction of the arrow, shown in Figure 1, or is swung in a back-and-forth motion in a pendulum-like manner. It should be understood that the blade 15 may be readily and conveniently replaced or removed for sharpening if desired, and due to the fact that the various parts are connected by a nut and bolt connection, these parts may be readily removed for the purpose of repair or replacement. The swinging of the two-edged blade in a pendulum-like manner will provide a double cutting capacity in that the blade will be permitted to cut both ways in its backward and forward swinging movement.

In Figure 7, there is shown a modified form of the invention, wherein the shank S is provided with a reinforcing strap 22 extending down around the lower end of the shank and the lower bracket 16' is provided with a socket portion 16a for receiving the strap 22 and bracing the same, as well as bracing the lower bracket 16'. The bracket 16' is provided with a forwardly extending, downwardly bent portion 17' similar to the bracket 16 illustrated in Figure 2. The forward bracket 17a is similar to the forward bracket illustrated in Figure 2.

The operation of the device is as follows:—

The grip portions 8 and 10 may be gripped by either hand of the operator which may be found most convenient, and the tool or shank 1 of the tool may be held in front of the body. The tool may then be swung in a back-and-forth pendulum-like manner from side to side, thereby providing considerable leverage for facilitating the cutting of the undergrowth, weeds, or grass, with a minimum amount of effort. The mounting of the hand grip 8 as illustrated and described will hold the shank 1 in forward spaced relation with respect to the body of the operator, and the special construction of the brackets 16 by providing the forwardly extending curved or offset blade connection will prevent the contact of the bracket with the foot of the operator since the blade will be supported in a forwardly extended position or will be offset forwardly to such a position as to prevent the contact of the blade with the foot of the operator. Through the medium of the present tool, a large area may be readily and quickly cleared of underbrush, grass, weeds, and the like, with a minimum amount of effort due to the pendulum-like swinging action of the shank which is possible through the medium of the rotatably mounted hand grips mounted in oppositely extended relation upon opposite sides of the shank.

It should be understood that certain detail changes in the mechanical construction may be employed without departing from the spirit of the invention so long as these changes fall within the scope of the appended claims.

Having described the invention, what is claimed as new is:—

1. A tool of the class described comprising an elongated shank, a forwardly extending cutting blade carried by the lower end of the shank, a rearwardly extending bracket carried by the upper end of the shank, a rotating hand grip supported upon said bracket in rearwardly spaced relation with respect to said shank, and a second grip member carried by the front face of the shank and extending forwardly thereof and arranged in spaced relation with respect to said first mentioned grip for facilitating the swinging of said shank upon said first mentioned grip in a pendulum-like manner.

2. A tool of the class described comprising an elongated shank, a forwardly extending cutting blade carried by the lower end of the shank, a rearwardly extending bracket carried by the upper end of the shank, a rotating hand grip supported upon said bracket in rearwardly spaced relation with respect to said shank, and a second grip member carried by the front face of the shank and extending forwardly thereof and arranged in spaced relation with respect to said first mentioned grip for facilitating the swinging of said shank upon said first mentioned grip in a pendulum-like manner, and a supporting pin for rotatably supporting said second mentioned grip member.

3. A tool of the class described comprising a shank, rotatable hand grips journaled upon said shank and extending from opposite faces thereof to facilitate the swinging of the shank in pendulum-like manner, a cutting blade having oppositely extending sharpened side edges, supporting brackets carried by the lower end of said shank, and said brackets being downwardly and forwardly curved for holding said blade in forward offset relation to prevent the contact of the brackets and blade with the foot of the operator when the tool is in use.

4. A tool of the class described comprising a shank, hand grips for said shank, a reinforcing strap for the lower end of said shank and extending under the lower end of the shank, cutting blade supporting brackets carried by the shank, and one of the cutting blade supporting brackets having an offset pocket for receiving said strap to facilitate the holding of the strap in position and also to facilitate the holding of the socket portion of one of the brackets in anchored position with respect to said strap.

5. A tool of the class described comprising an elongated shank, a forwardly extending cutting blade carried by the lower end of said shank, a hand grip carried near the opposite end of said shank, a second hand grip carried by said shank intermediate the blade and said first mentioned hand grip, the hand grips being secured to opposite faces of said shank, one hand grip extending forwardly and the other hand grip extending rearwardly, the longitudinal axes of the hand grips being in substantially parallel relation, the hand grips being so mounted upon the shank to permit a free unobstructed pendulum-like swing of the shank during the swinging of said shank by the operator.

6. A tool of the class described comprising an elongated shank, a forwardly extending cutting blade carried by the lower end of said shank, a rotating hand grip carried near the opposite end of said shank, a second rotating hand grip carried by said shank intermediate the blade and said first mentioned hand grip, the hand grips being secured to opposite faces of said shank, one hand grip extending forwardly and the other hand grip extending rearwardly, the longitudinal axes of the hand grips being in substantially parallel relation, the hand grips being so mounted upon the shank to permit a free unobstructed, pendulum-like swing of the shank during the swinging of said shank by the operator.

7. A tool of the class described comprising an elongated shank, a forwardly extending cutting blade carried by the lower end of the shank, a rearwardly extending rotating hand grip supported near the upper end of said shank, and a second grip member carried by the front face of said shank and extending forwardly thereof and arranged in spaced relation with respect to said first mentioned grip for facilitating the swinging of said shank upon said first mentioned grip in a pendulum-like manner.

JAMES L. GREEN, Sr.